United States Patent [19]

Putz, II

[11] Patent Number: 5,018,296
[45] Date of Patent: May 28, 1991

[54] TROLLING DEVICE FOR FISHING

[76] Inventor: Carl F. Putz, II, 1880 Harbor Island Dr., San Diego, Calif. 92101

[21] Appl. No.: 448,932

[22] Filed: Dec. 12, 1989

[51] Int. Cl.⁵ ............................................. A01K 83/00
[52] U.S. Cl. ..................................... 43/43.12; 43/42.13
[58] Field of Search ................... 43/43.12, 43.13, 43.1, 43/42.31; 242/106

[56] References Cited

U.S. PATENT DOCUMENTS

| | | | |
|---|---|---|---|
| 2,545,185 | 3/1951 | Winslow | 43/43.12 |
| 2,726,475 | 12/1955 | Wiselka | 43/43.13 |
| 2,749,649 | 6/1956 | Fitzsimmons | 43/43.12 |
| 2,924,907 | 2/1960 | Hamilton | 43/43.13 |
| 3,401,483 | 9/1968 | Bellah et al. | 43/43.1 |
| 3,808,727 | 5/1974 | Flanders | 43/43.13 |
| 3,835,573 | 9/1974 | Borchardt | 43/43.13 |
| 3,898,759 | 8/1975 | Jensen | 43/43.13 |
| 4,028,837 | 6/1977 | Clark | 43/43.12 |
| 4,129,956 | 12/1978 | Neary | 43/43.13 |
| 4,212,127 | 7/1980 | Daniels | 43/43.12 |
| 4,581,842 | 4/1990 | Kalberer | 43/43.13 |
| 4,750,288 | 6/1988 | Brennan | 43/43.12 |

FOREIGN PATENT DOCUMENTS 0971360  7/1975  Canada .................. 43/43.13

Primary Examiner—Kurt Rowan
Assistant Examiner—James Miner
Attorney, Agent, or Firm—Brown, Martin, Haller & McClain

[57] ABSTRACT

A trolling device for fishing at a desired depth comprises a plate-like hydrofoil member having a leading edge and a trailing edge, a first strut extending upwardly from the hydrofoil member, the strut having an opening or other securing device for securing it to the end of a downrigger line to tow the device behind a boat. A releasable fastening device is secured to the trolling device for releasably securing it to an intermediate position on a fishing line. A weighted keel assembly depends downwardly from the hydrofoil member to direct it downwardly at its leading edge into a diving position when the device is suspended from the towing or downrigger line of a boat.

18 Claims, 2 Drawing Sheets

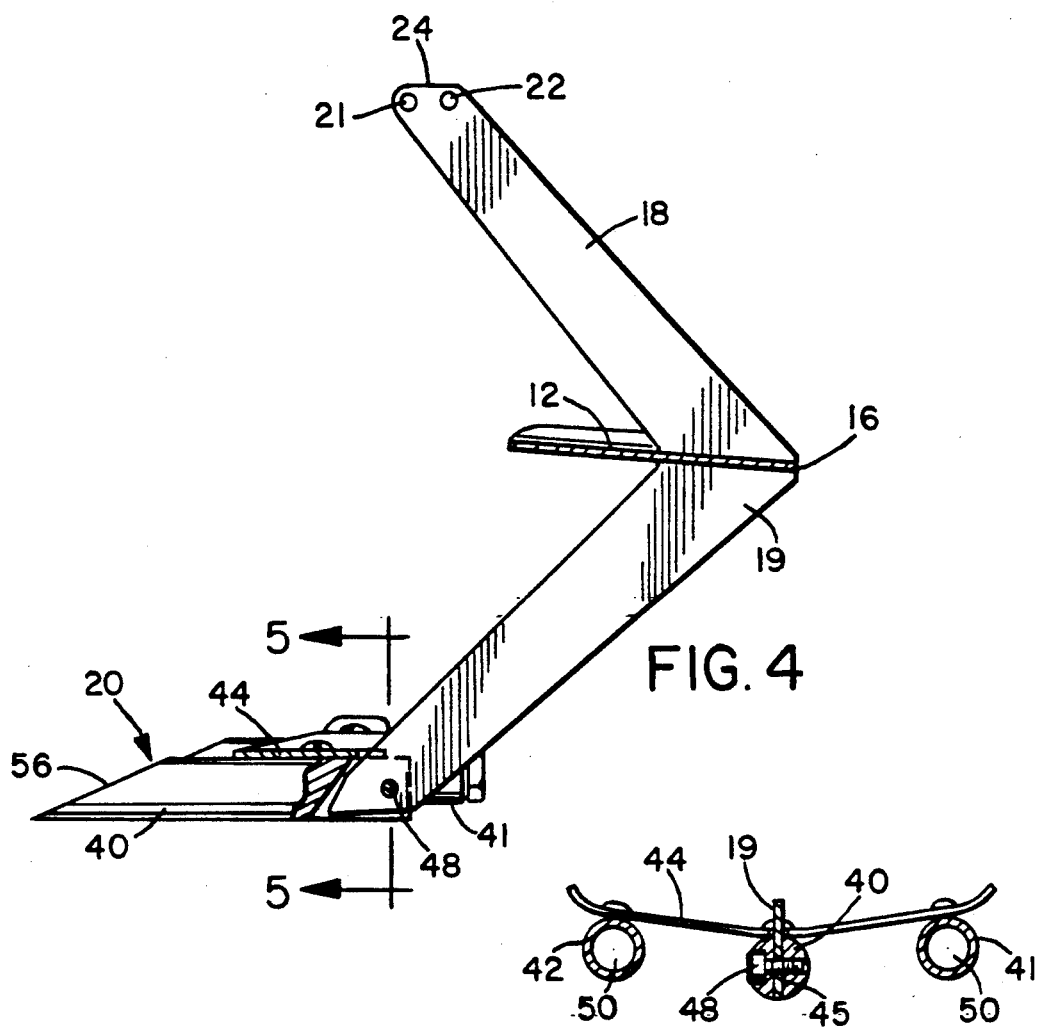
FIG. 4
FIG. 5
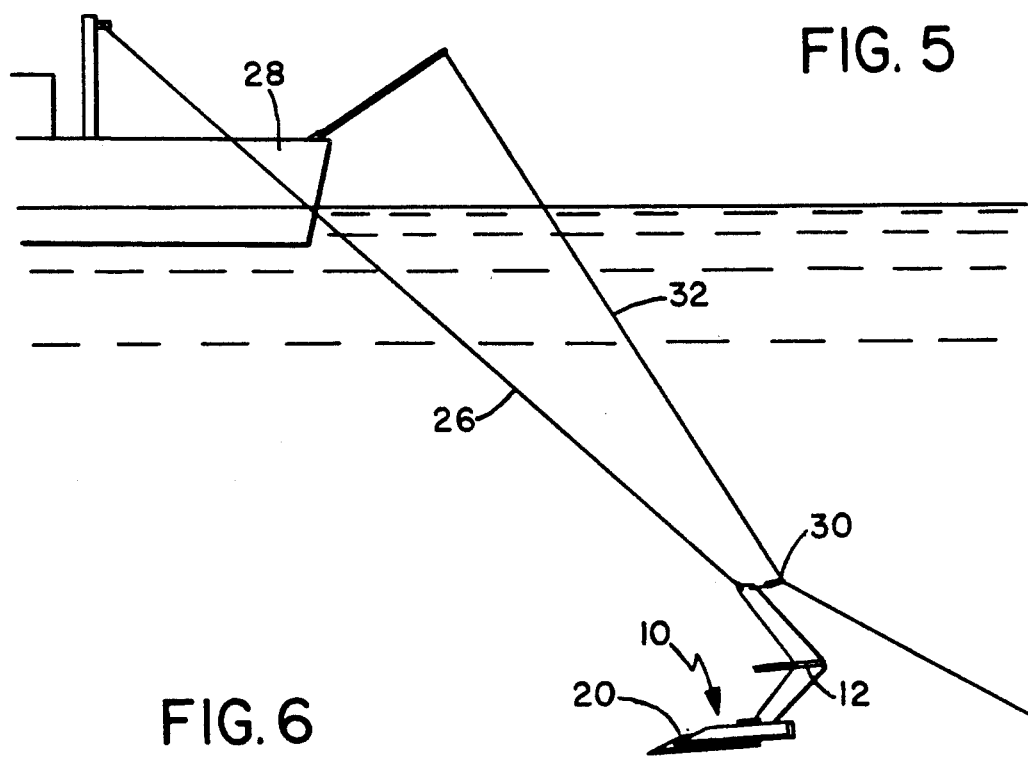
FIG. 6

TROLLING DEVICE FOR FISHING

BACKGROUND OF THE INVENTION

The present invention relates to a trolling device for allowing fishing from a boat at a desired water depth where fish are to be found.

Trolling devices are used in fishing to submerge a lure or other fishing device to a desired depth and to maintain it at that depth while the lure is pulled behind a moving boat. Some such devices comprise relatively heavy weights attached to the fishing line. Alternatively, so-called downrigger lines are used, which are suspended from the rear end of a boat and weighted down with heavy weights attached to their ends. One or more fishing lines are releasably attached at one or more depths along the length of the downrigger line, and the weighted line is lowered to the desired fishing depth carrying the fishing line or lines and attached lure with it. When a fish strikes a lure, the increased tension on the fishing line releases it from the downrigger line.

As an alternative to heavily weighted downrigger lines or fishing lines, trolling divers are sometimes used. Such divers are normally positioned along the length of the fishing line and include a planing surface at an angle to the horizontal, so that when they are pulled through the water they drag down or depress the lure. However, devices of this type generally are dependent on external conditions such as boat speed, water currents and the like which determine the final depth. Also, such trolling divers or platforms have a tendency to wobble from side to side as they are towed, or even to pop up to the surface under same conditions. Additionally, since these devices are connected in series with the fishing line itself, they can cause water resistance and difficulty in pulling in the line when a fish is caught.

U.S. Pat. No. 3,808,727 of Flanders describes a known trolling device or diver in which a plate has a variable, multiple position weight assembly attached to its front end as well as other adjustment mechanisms for controlling the angle of the plate and thus the distance of descent of the device. The device is secured to a tow line at its front end and to a lure at its rear end. Thus, the device is connected in series with the fishing line. In U.S. Pat. No. 4,581,842 of Kalberer, U.S. Pat. No. 4,129,956 of Neary and U.S. Pat. No. 3,898,759 of Jensen a trolling diver secured in series along a fishing line is designed to be re-orientated on a fish strike from a diving to a rising mode, allowing a caught fish to be played and reeled in more easily.

U.S. Pat. No. 4,212,127 of Daniels shows a different arrangement in which a fishing line is releasably secured to the diving plane, while the plane itself is slidably attached to a weighted downrigger line. This avoids the some of the problems of serially connected diving planes since the fishing line is detached from the diving device on a fish strike. However, it does require a heavily weighted downrigger line for operation.

SUMMARY OF THE INVENTION

It is an object of this invention to provide an improved diving trolling device.

According to the present invention a trolling device for attachment to a downrigger line is provided, which comprises a plate-like hydrofoil member for controlling the diving depth, the hydrofoil member having a leading end and a trailing end, a first strut projecting upwardly from the planing member, the first strut having a securing device at its upper end for securing it to the end of the downrigger or towing line of a boat, a weighted keel assembly attached to the hydrofoil member for directing it downwardly when towed behind a boat, and a releasable securing device for releasably securing the trolling device to a fishing line.

Since the trolling device is released from the fishing line on a fish strike, the problems of playing and landing a fish with a fishing line attached to a relatively bulky diving plane are avoided. Also, since the device is designed to be attached to the end of a towing or downrigger line and to submerge the downrigger line to a desired depth, the downrigger line does not have to have heavy weights attached, avoiding the problems of raising and lowering such lines when attached to such heavy weights.

Preferably, the side edges of the hydrofoil member have a slight upwards curvature to aid in stabilizing the device during towing. The first strut projects upwardly from the trailing edge of the hydrofoil member and is angled forwardly towards its leading edge in a preferred embodiment of the invention. The strut preferably comprises a planar bar member extending in a plane perpendicular to the hydrofoil member and in alignment with the towing direction to minimize water resistance. The leading edges of both the hydrofoil and first strut may be sharpened to provide cutting edges for cutting through any weeds or other material in the path of the trolling device, reducing the risk of snagging. Preferably, the fishing line is also releasably secured to the upper end of the first strut, so that the trolling device is suspended below both the fishing line and the downrigger line, and is less likely to become snagged on the lines. It will tend to be urged backwardly by the water flow on movement of the boat, moving into an angled diving position in which it dives downwardly, submerging the fishing line to a desired depth determined by the length of the downrigger line deployed as well as the speed of the boat and the diving angle of the device.

In a preferred embodiment of the invention, the weighted keel assembly is secured to the hydrofoil member by means of a second strut depending downwardly from the hydrofoil member and co-planar with the first strut. The second strut is preferably also angled towards the leading end of the device, so that the two struts together form an overall V-shape with the pointed end of the V facing rearwardly or away from the direction of travel of the device when towed. The leading edge of the second strut may be sharpened to provide a cutting edge. The weighted keel assembly preferably comprises at least one central pod or ballast member secured to the lower end of the second strut in alignment with the direction of travel of the device. Parallel side pods may be secured one on each side of the central pod to provide additional luring means such as a scent dispenser or noise maker such as a rattle to improve the chances of attracting fish to the lure. Preferably, the keel assembly is adjustably mounted on the end of the second strut to allow the angle of the pod or pods to be adjusted for different boat speeds, for example to decrease the diving angle at higher speeds, when the device might otherwise tend to pop up.

The trolling device of this invention has been found to allow trolling at higher boat speeds and to avoid the need for heavy weights as well as the problems of having a diving device connected in series with a fishing line. The fishing line detaches automatically on a fish strike, allowing the user to play the fish and reel in the line freely.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 4 is a sectional view taken on line 4—4 of FIG. 2.

FIG. 5 is a sectional view taken on line 5—5 of FIG. 4; and

FIG. 6 illustrates the trolling device in operation.

DESCRIPTION OF THE PREFERRED EMBODIMENT

Figure 1:
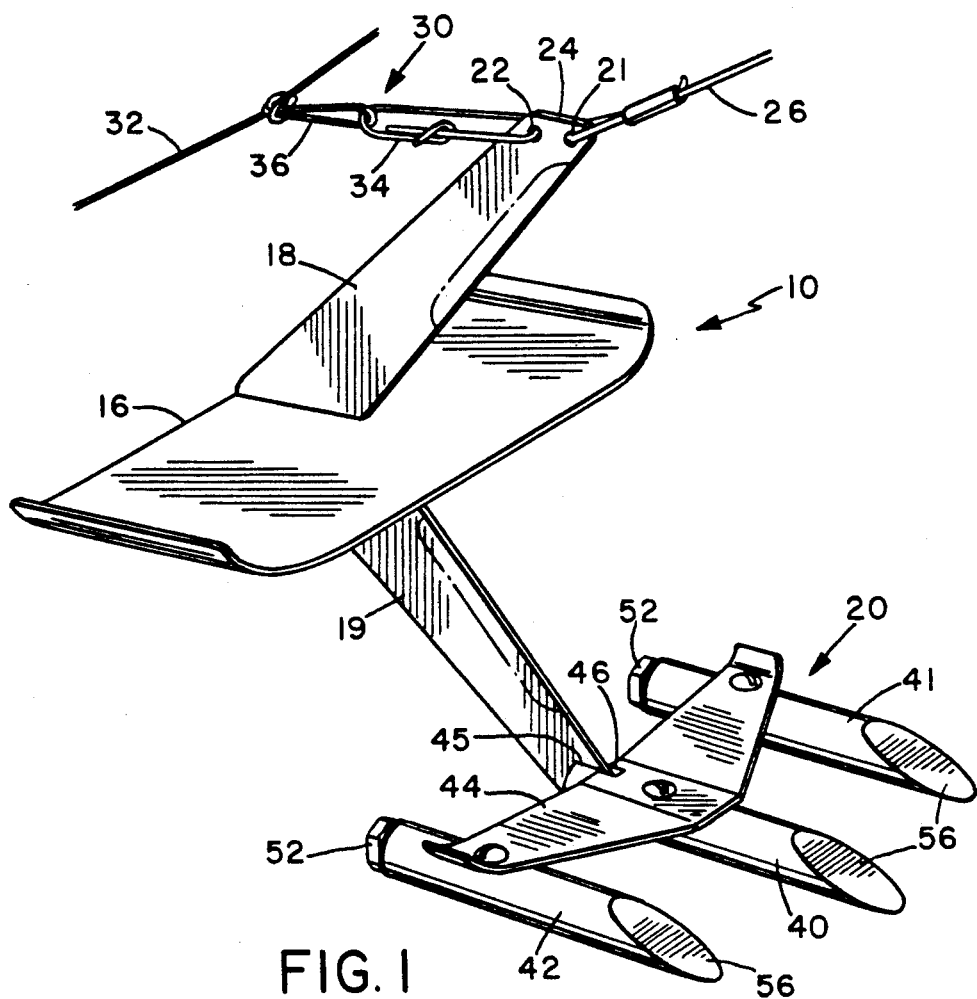
FIG. 1 is a perspective view of the trolling device according to a preferred embodiment of the invention.

The drawings illustrate a preferred embodiment of a diving or trolling device 10 according to the present invention. The device 10 basically comprises a generally plate-like or planar hydrofoil member 12 having a leading edge 14 which is intended to face in the direction of travel in the towing position illustrated in FIGS. 1 and 6, and a trailing end 16, and a first strut 18 extending upwardly from a location adjacent the rear or trailing end 16 of the hydrofoil member. A second strut 19 extends downwardly from the hydrofoil member from a location adjacent the trailing end, and a weighted keel assembly 20 is secured to the lower end of the second strut. The first and second struts 18 and 19 are both plate-like or planar, elongate members extending perpendicular to the hydrofoil member in a plane aligned with the towing direction of the device, and are both angled forwardly to define a general V-shape or wing (see FIG. 4) with its pointed end facing away from the towing direction, as best seen in FIG. 6.

The first strut 18 has a pair of fastener openings 21,22 adjacent its upper end 24. The leading opening 21 adjacent the forward end of the strut is used to secure the device to the end of a towing or downrigger line 26 suspended from a boat 28, as illustrated in FIG. 6. The trailing opening 22 adjacent the trailing end of the strut is secured to a suitable releasable fastening device 30 for releasably securing the trolling device to a fishing line 32 at an intermediate point along its length, as best illustrated in FIGS. 1 and 6. Any releasable fastening device as is known in the fishing or trolling field may be used, for example a spring loaded snap fastener, or the rubber band type of fastener illustrated in FIG. 1. The fastening device illustrated in FIG. 1 comprises a wire clip 34 secured in opening 22 and a rubber band 36 secured to the fishing line and passing through the wire clip 34. When a fish strikes, the rubber band will snap to release the fishing line from the trolling device. The fishing line may have a suitable lure 38 at its free end of any known type, including live bait.

Figure 2:
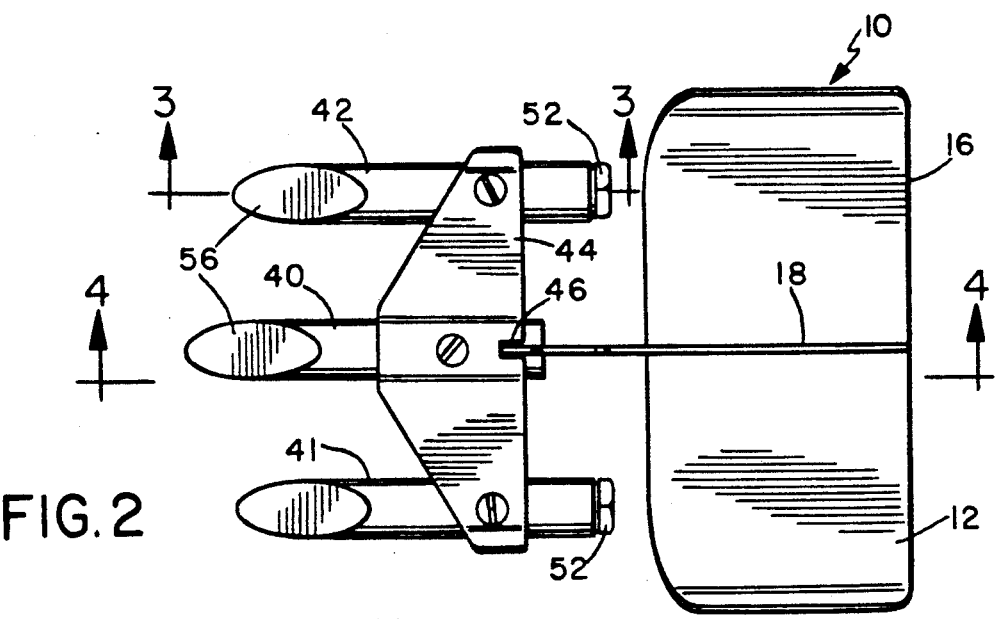
FIG. 2 is a top plan view of the device.
Figure 3:
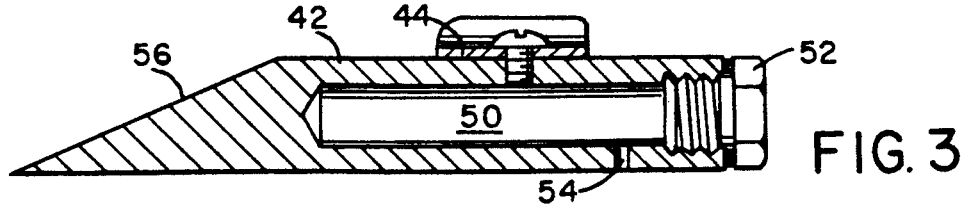
FIG. 3 is an enlarged sectional view taken on line 3—3 of FIG. 2.

The keel assembly 20 comprises a central solid weighted pod or ballast member 40 of generally cylindrical shape and a pair of side pods or wing members 41,42 secured one on each side of the central pod 40 via cross plate 44 to which all three pods are bolted. The lower end of strut 19 extends into a slot 45 at the rear end of pod 40 and an aligned notch 46 in the rear edge of the cross plate 44 (see FIGS. 1 and 2), and is secured to the pod 40 via fastener screw 48 which extends through the slot in the rear end of the pod 40 and the lower strut, as best illustrated in FIG. 5. The screw can be loosened to allow the keel assembly to be rotated relative to the strut to adjust the angle of the pods relative to the strut, and re-tightened once an optimum angle is achieved. This allows the diving angle of the trolling device to be controlled according to the boat speed, as will be explained in more detail below. The front edge of notch 46 serves as a stop to limit the upward angular displacement of the keel assembly relative to the plane defined by the hydrofoil member. Slot 45 is configured as to provide an internal stop to limit the downward angular displacement of the keel assembly as it is rotated downward about fastener screen 48. The side pods 41 and 42 are of similar cylindrical shape to central pod 40, and extend parallel to pod 40. However, in the preferred embodiment, side pods 41 and 42 are hollow rather than solid, and have internal chambers 50 with releasable end caps 52. The internal chambers may contain some type of noise making device such as a rattle for luring fish, or alternatively may contain a suitable scented material for attracting fish which is dispensed via orifice 54 as the pods are towed through the water. Each of the three pods is hydrodynamically shaped with flattened or tapered leading faces 56.

The hydrofoil member 12, first and second struts 18 and 19, and cross or connecting plate 44, are preferably all of a suitable material such as aluminum, for example. The hydrofoil member 12 may be removable from the first and second struts to facilitate shipping and assembly. The pods 40, 41 and 42 are also of a suitable metal such as brass. The leading edges 58 and 60 of the first strut 18 and second strut 19 may be sharpened as illustrated in FIG. 1, to provide a cutting edge for cutting through weeds or other material in the path of the device. Preferably, the hydrofoil member has a slight upward curvature at its side edges, as best illustrated in FIG. 4.

FIG. 6 illustrates the trolling device in operation to submerge a lure 38 at the end of a fishing line 32 to a desired depth as it is towed behind boat 28. The weighted keel assembly will act to direct the hydrofoil member downwardly at its forward edge when it is suspended from the downrigger line 26, with the downward angle being increased as the keel assembly is rotated relative to the strut 19 in an anti-clockwise direction from the position illustrated in FIG. 4, assuming a constant boat speed. Thus, the diving angle can be increased by adjusting the angle of the keel assembly as the boat speed is increased, reducing the risk of the trolling device popping up at high boat speeds.

The depth to which the device will dive when released will depend on a number of factors, including the boat speed, the length of downrigger line 26 let out, the weight and shape of the lure 38, as well as the weight and angle of the keel assembly 20 which directs the forward end of the hydrofoil member downwardly. Thus, the diving depth can be adjusted, for example, by increasing or decreasing the length of downrigger line let out, as well as by adjusting the angle of the keel assembly. When the device is initially deployed, the weighted keel assembly will direct the leading edge of hydrofoil member 12 downwardly, angling the hydrofoil member relative to the flow of water. As the device is pulled through the water, hydraulic pressure against the upper surface of the hydrofoil member causes the device to dive. The device will ultimately reach an equilibrium position determined by the buoyant forces exerted by the water and the action of the boat pulling on the line (i.e. the boat speed), at which point it will start to plane through the water at a more or less constant depth (the diving depth). This depth can be controlled by changing the boat speed, the length of the downrigger line, and also the angle of the weighted keel assembly, allowing better control of the trolling depth. The tendency of the device to pop up to the surface of the water at high boat speeds can be reduced by decreasing the diving angle as the boat speed is increased, allowing the trolling device to be used effectively at boat speeds of fifteen knots or more, whereas previous known diving planars could only be used effectively at speeds up to six knots. Thus, this device allows trolling at higher speeds.

The upper and lower struts are co-planar and in alignment with the direction of travel of the device so that they produce minimum drag as the device is pulled through the water. The leading edges of the pods and the connecting plate 44 of the keel assembly are also hydrodynamically shaped to minimize or reduce drag which could otherwise cause the device to pop up at high speed. As can be seen in FIG. 6, the upper and lower struts form a V shape with its pointed end facing rearwardly, rather than forwardly as would be conventional. It has been found that this design improves the operational characteristics of the device. The cutting edges 14, 58 and 60 reduce the risk of the device snagging or becoming tangled up on weeds or the like underwater, since they will tend to cut through any weeds or strands in their path.

Once a fish strikes the lure 38, the fishing line separates from the trolling device, which will therefore not be pulled from side to side by the motions of the caught fish. The user will also be able to play and reel in the fish freely without the impediment of a relatively bulky trolling or diving device on the line.

The trolling device described above can be used at the end of a downrigger line without any additional downrigger weight and without the disadvantages of being secured in series with a fishing line. It is relatively stable and will tend to resist side-to-side motions, increasing its ability to be pulled smoothly in line with the vessel towing direction. It allows the fishing line to be released on each fish strike, permitting the user to play and reel in the fish without impediment from the trolling device itself.

Although a preferred embodiment of the invention has been described above by way of example only, it will be understood by those skilled in the field that modifications may be made to the disclosed embodiment without departing from the scope of the invention, which is defined by the appended claims.

I claim:

1. A trolling device for attachment to a downrigger line, comprising:
   a plate-like hydrofoil member having a leading end and a trailing end;
   a first strut projecting upwardly from the hydrofoil member and having first securing means at its upper end for securing it to the end of a first downrigger line and second, releasable securing means spaced from said first securing means for securing said first strut to an intermediate point in the length of a second, fishing line, the releasable securing means including release means for releasing the fishing line if a predetermined force is applied to the free end of the fishing line; and
   a weighted keel assembly depending downwardly from the hydrofoil member for directing it downwardly at its leading edge when suspended from a boat downrigger line.

2. The device as claimed in claim 1, including a second strut depending downwardly from said hydrofoil member, the keel assembly being secured to the lower end of said second strut.

3. The device as claimed in claim 2, wherein said struts have sharpened leading edges forming cutting edges.

4. The device as claimed in claim 1, wherein the hydrofoil member comprises a generally rectangular plate with its longer edges comprising said leading and trailing edges.

5. The device as claimed in claim 1, wherein said first strut has a first opening adjacent its upper end, said opening comprising said securing means for securing said strut to the end of a downrigger line extended through said opening.

6. The device as claimed in claim 5, wherein said first strut has a second opening positioned rearwardly of said first opening, said releasable securing means being secured to said second opening.

7. The device as claimed in claim 1, wherein the keel assembly is hydrodynamically shaped at its leading end.

8. The device as claimed in claim 7, wherein the keel assembly comprises at least one elongate pod member directed generally in the towing direction, the pod member having a tapered leading edge.

9. A trolling device for attachment to a downrigger line, comprising:
   a plate-like hydrofoil member having a leading end and a trailing end;
   a first strut projecting upwardly from the hydrofoil member and having a first securing means at its upper end for securing it to the end of a first, downrigger line;
   second, releasable securing means for releasably securing the trolling device to an intermediate point in the length of a second, fishing line, the releasable securing means including release means for releasing the fishing line if a predetermined force is applied to the free end of the fishing line;
   a second strut depending downwardly from the hydrofoil member;
   a weighted keel assembly secured to the lower end of said second strut; and
   the struts being co-planar and together forming a general V-shape with the pointed end of the V facing in the opposite direction to the hydrofoil member leading edge.

10. The device as claimed in claim 9, wherein the struts each comprise flat, elongate plate members extending perpendicular to the hydrofoil member and transverse to its leading edge.

11. A trolling device for attachment to a downrigger line, comprising:
    a plate-like hydrofoil member having a leading end and a trailing end;
    a first strut projecting upwardly from the hydrofoil member and having first securing means at its upper end for securing it to the end of a first, downrigger line;

second, releasable securing means for releasably securing the trolling device to an intermediate point in the length of a second, fishing line, the releasable securing means including release means for releasing the fishing line if a predetermined force is applied to the free end of the fishing line;

a second strut depending downwardly from the hydrofoil member for directing it downwardly at its leading edge when suspended from a boat downrigger line; and a weighted keel assembly secured to the lower end of the second strut;

the keel assembly comprising at least one elongate pod member extending transverse to said second strut and directed generally in the towing direction, and adjustable securing means for adjustably securing the pod member to the lower end of said second strut at an adjustable angle relative to said second strut.

12. The device as claimed in claim 11, including a pair of side pods of similar shape to the first-mentioned pod member and connecting means for securing said side pods one on each side of the first mentioned pod and parallel to said first-mentioned pod.

13. The device as claimed in claim 12, wherein each of said pods is hydrodynamically shaped at its forward end.

14. The device as claimed in claim 12, wherein said side pods each comprise a generally cylindrical member having an internal chamber open at one end, and an end cap releasably mounted in the open end of said chamber.

15. The device as claimed in claim 14, wherein said side pods each have at least one dispensing orifice connected with said internal chamber for dispensing fish luring material out of said chamber.

16. The device as claimed in claim 12, wherein said connecting means comprises a cross plate extending across said pods and securing means securing each pod to said cross plate.

17. The device as claimed in claim 11, wherein said first-mentioned pod member is a solid, generally cylindrical member.

18. A fishing apparatus, comprising:

a downrigger line for securing at one end to a boat;

a fishing line for suspending from the boat, the fishing line having a hook at its free end;

a trolling device secured to the free end of the downrigger line, and releasably secured to an intermediate point in the length of the fishing line;

the trolling device comprising a plate-like hydrofoil member having a leading end and a trailing end, a first strut projecting upwardly from the hydrofoil member, said downrigger line being secured to the upper end of said first strut, a releasable securing device secured to said first strut at a location spaced from said downrigger line for releasably securing said fishing line to said trolling device, said releasable securing device comprising means for releasing said fishing line if a predetermined force is applied to the free end of said fishing line, and a weighted keel assembly depending downwardly from the hydrofoil member for directing it downwardly at its leading edge.

* * * * *